United States Patent
Jarchafjian et al.

(10) Patent No.: US 9,179,285 B1
(45) Date of Patent: Nov. 3, 2015

(54) REFLECTION-BASED LOCATION DETECTION

(71) Applicant: Disney Enterprises, Inc., Burbank, CA (US)

(72) Inventors: Harout Jarchafjian, Glendale, CA (US); Jeffrey Voris, Los Angeles, CA (US); Benjamin F. Christen, Los Angeles, CA (US); Robert P. Michel, Toluca Lake, CA (US)

(73) Assignee: Disney Enterprises, Inc., Burbank, CA (US)

( * ) Notice: Subject to any disclaimer, the term of this patent is extended or adjusted under 35 U.S.C. 154(b) by 45 days.

(21) Appl. No.: 14/281,495

(22) Filed: May 19, 2014

(51) Int. Cl.
| | |
|---|---|
| H04B 7/00 | (2006.01) |
| H04W 8/00 | (2009.01) |
| H04W 52/02 | (2009.01) |
| G01S 5/02 | (2010.01) |

(52) U.S. Cl.
CPC ............. H04W 8/005 (2013.01); G01S 5/0289 (2013.01); H04W 52/0209 (2013.01)

(58) Field of Classification Search
CPC ..... H04W 84/18; H04W 88/06; H04W 76/02; H04W 8/245; H04W 24/02; H04W 88/04; H04W 16/26; H04M 1/7253; H04M 1/72522; H04M 2250/02
USPC ......... 455/41.2, 11.1, 404.1, 404.2, 418–420, 455/456.1, 456.6, 507, 517
See application file for complete search history.

(56) References Cited

U.S. PATENT DOCUMENTS

| | | | |
|---|---|---|---|
| 6,718,158 B1 * | 4/2004 | Suonvieri | H04B 7/15542 455/11.1 |
| 6,795,019 B2 | 9/2004 | Holt | |
| 7,072,612 B2 | 7/2006 | Soliman | |
| 7,373,155 B2 | 5/2008 | Duan | |
| 7,400,890 B2 | 7/2008 | Lee | |
| 7,750,841 B2 | 7/2010 | Oswald | |
| 7,990,314 B2 | 8/2011 | Liao | |
| 8,150,421 B2 | 4/2012 | Ward | |
| 8,253,539 B2 | 8/2012 | Scaramozzino | |
| 8,374,632 B2 * | 2/2013 | Ristich et al. | H04W 64/00 342/451 |

(Continued)

FOREIGN PATENT DOCUMENTS

WO   WO 2011/097414   8/2011

OTHER PUBLICATIONS

Yuan Zhou, "Indoor Elliptical Localization Based on Asynchronous UWB Range Measurement", Jan. 2011, pp. 248-257 (10).

(Continued)

Primary Examiner — Nhan Le
(74) Attorney, Agent, or Firm — Farjami & Farjami LLP

(57) ABSTRACT

There is provided a system including a mobile device configured to transmit a first advertisement to a listening device and a repeater device, receive a data advertisement from the listening device in response to transmitting the first advertisement to the listening device, the data advertisement including a time difference between the listening device receiving the first advertisement and the listening device receiving a second advertisement transmitted from the repeater device in response to transmitting the first advertisement from the mobile device to the repeater device, and determine a location of the mobile device using the data advertisement including the time difference. In the system, the listening device and the repeater device may each include Bluetooth low energy devices.

20 Claims, 3 Drawing Sheets

(56) References Cited

U.S. PATENT DOCUMENTS

| | | |
|---|---|---|
| 8,395,547 B2 | 3/2013 | Dhanani |
| 8,489,114 B2 | 7/2013 | Zhang |
| 8,502,670 B2 | 8/2013 | Cha |
| 8,594,704 B2 * | 11/2013 | Karabinis .......... H04B 7/18513 455/412.2 |
| 8,639,214 B1 * | 1/2014 | Fujisaki ................ G06Q 20/32 379/88.03 |
| 2010/0042839 A1 | 2/2010 | Ho |
| 2012/0238208 A1 * | 9/2012 | Bienas et al. ........... H04W 8/24 455/41.2 |
| 2014/0022128 A1 | 1/2014 | Smith |
| 2014/0039823 A1 | 3/2014 | Raghupathy |

OTHER PUBLICATIONS

"Robin—the Siri Challenger—Android Apps on Google Play", Robin Labs—Feb. 11, 2014, pp. 1-2, https://play.google.comistore/apps/details?id=com.magnifis.parking&hl=en.

* cited by examiner

REFLECTION-BASED LOCATION DETECTION

BACKGROUND

Nowadays, numerous software applications on mobile devices require tracking the location of the mobile devices to work properly. As such, different systems have been developed to accurately determine the location of a mobile device. For example, Global Positioning System (GPS), cell tower based tracking, and Wi-Fi based tracking are a few of the systems that have been developed in order to track the location of a mobile device, such as a mobile phone. However, many problems can occur with mobile devices that implement these current systems. For example, some of the current systems require a precision synchronization of time clocks between multiple stations that are used to determine the location of the mobile device. As such, even a small difference in the synchronization of the time clocks can mean significant errors when determining the location of the mobile device. As another example, the current systems require the mobile device to constantly transmit and listen for messages. This requires a lot of battery power to perform and as such drains the power supply of the mobile device.

SUMMARY

The present disclosure is directed to reflection-based location detection, substantially as shown in and/or described in connection with at least one of the figures, as set forth more completely in the claims.

DETAILED DESCRIPTION

Figure 1:
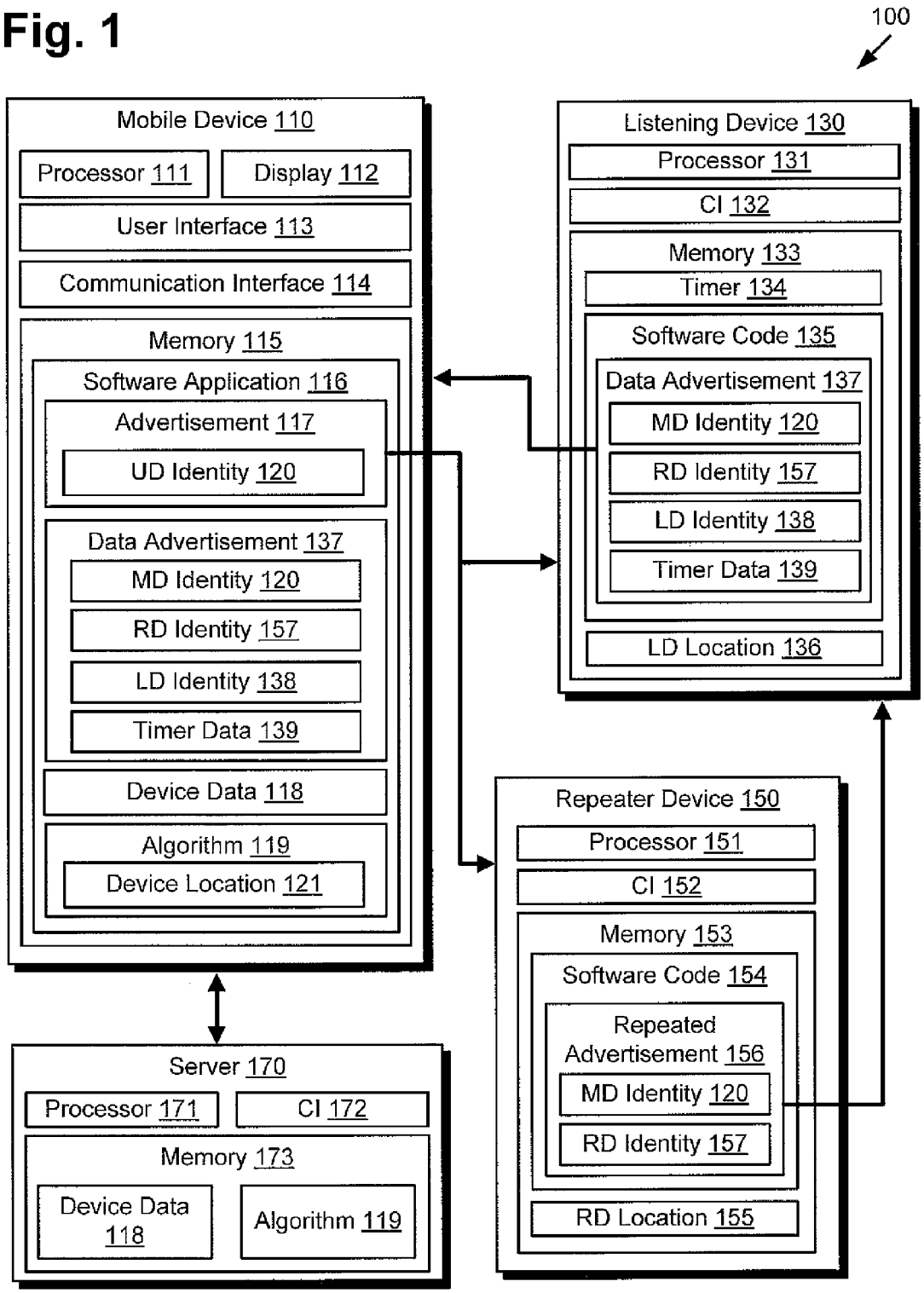
FIG. 1 presents a system for reflection-based location detection, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 presents a system for reflection-based location detection, according to one implementation of the present disclosure. System 100 of FIG. 1 includes mobile device 110, listening device 130, repeater device 150, and server 170. Mobile device 110 includes processor 111, display 112, user interface 113, communication interface 114, and memory 115. Memory 115 includes software application 116, which includes advertisement 117, device data 118, algorithm 119, and data advertisement 137. Advertisement 117 includes mobile device (MD) identity 120. Algorithm 119 includes device location 121. Data advertisement 137 includes mobile device identity 120, repeater device (RD) identity 157, listening device (LD) identity 138, and timer data 139. Listening device 130 includes processor 131, communication interface (CI) 132, and memory 133. Memory 133 includes timer 134, software code 135, and listening device location 136. Software code 135 includes data advertisement 137, which includes mobile device identity 120, repeater device identity 157, listening device identity 138, and timer data 139. Repeater device 150 includes processor 151, communication interface 152, and memory 153. Memory 153 includes software code 154 and repeater device location 155. Software code 154 includes repeater advertisement 156, which includes mobile device identity 120 and repeater device identity 157. Server 170 includes processor 171, communication interface 172, and memory 173. Memory 173 includes device data 118 and algorithm 119.

As illustrated in FIG. 1, system 100 includes four separate devices in communication with one another, mobile device 110, listening device 130, repeater device 150, and server 170. Each of the devices of system 100 may include a personal computer, a mobile phone, a tablet, a wireless communication device, such as a Bluetooth low energy wireless device. For example, in one implementation, mobile device 110 includes a mobile phone, while listening device 130 and repeater device 150 each includes a Bluetooth low energy device. In such an example, mobile device 110, listening device 130, and repeater device 150 each communicate with each other using Bluetooth low energy wireless technology.

It should be noted that the implementation of FIG. 1 only illustrates one mobile device 110, one listening device 130, one repeater device 150, and one server 170, however, the present disclosure is not limited to the implementation of FIG. 1. In other implementations, there can be multiple mobile devices, listening devices, repeater devices, and servers in communication with one another. For example, in one implementation, mobile device 110 may be in communication with more than one listening device 130 and more than one repeater device 150.

As shown in FIG. 1, mobile device 110 includes user interface 113 and display 112. User interface 113 may comprise, for example, a keyboard, a mouse, a game controller, a touch-screen input, a thermal and/or electrical sensor, or any other device capable of accepting user input for use with mobile device 110. Display 112 may comprise a liquid crystal display (LCD) screen built into mobile device 110. In alternative implementations of the present disclosure, display 112 may be another type of display hardware, such as cathode-ray tubes (CRT) monitors. In yet other implementations, display 112 may also be touch sensitive and may serve as user interface 113. Moreover, user interface 113 and display 112 may be externally attached to mobile device 110 through physical or wireless technology.

Also illustrated in FIG. 1, mobile device 110 includes processor 111 and memory 115. Processor 111 may be configured to access memory 115 to store received input or to execute commands, processes, or programs stored in memory 115, such as software application 116. Processor 111 may correspond to a processing device, such as a microprocessor or similar hardware processing device, or a plurality of hardware devices. Memory 115 is a sufficient memory capable of storing commands, processes, and programs for execution by processor 111.

It should be noted that processor 131 and memory 133 of listening device 130, processor 151 and memory 153 of repeater device 150, and processor 171 and memory 173 of server 170 may be similar to processor 111 and memory 115 of mobile device 110. For example, processor 131 of listening device 130 may be configured to access memory 133 to store received input or to execute commands, processes, or programs stored in memory 133. For a second example, processor 151 of repeater device 150 may be configured to access memory 153 to store received input or to execute commands, processes, or programs stored in memory 153. Finally, for a third example, processor 171 of server 170 may be configured to access memory 173 to store received input or to execute commands, processes, or programs stored in memory 173.

Also illustrated in FIG. 1, mobile device 110 further includes communication interface 114. In the implementation of FIG. 1, communication interface 114 includes any device that is capable both transmitting data with a transmitter and receiving data with a receiver. Processor 111 of mobile device 110 is thus configured to control communication interface 114 to communicate with other electronic devices, such as listening device 130, repeater device 150, and server 170. As such, communication interface 114 can utilize, for example, one or more of Wireless Fidelity (Wi-Fi), Worldwide Interoperability for Microwave Access (WiMax), ZigBee, Bluetooth, Bluetooth low energy, Code Division Multiple Access (CDMA), Evolution-Data Optimized (EV-DO), Global System for Mobile Communications (GSM), Long Term Evolution (LTE), and other types of wired and wireless technology.

It should be noted that communication interface 132 of listening device 130, communication interface 152 of repeater device 150, and communication interface 172 of server 170 are similar to communication interface 114 of mobile device 110. For example, in one implementation, as discussed above, each of communication interface 114, communication interface 132, and communication interface 152 may be utilizing Bluetooth low energy wireless technology. In such an implementation, each of mobile device 110, listening device 130, and repeater device 150 may communicate with one another using Bluetooth low energy specifications.

Also illustrated in FIG. 1, mobile device 110 includes software application 116. In the implementation of FIG. 1, mobile device 110 utilizes software application 116 to determine device location 121, where device location 121 gives a location of mobile device 110. As such, software application 116 may include source code automatically running on mobile device 110, or launched by a user of mobile device 110, that is used to determine device location 121 of mobile device 110. Furthermore, software application 116 may have come preloaded on mobile device 110 or software application 116 may be downloaded and installed by a user of mobile device 110.

Software application 116 determines device location 121 by first generating and transmitting advertisement 117, where advertisement 117 corresponds to a data packet that includes the identity of mobile device 110, such as mobile device identity 120. For example, in one implementation, mobile device identity 120 includes the media access control (MAC) address of mobile device 110. However, in other implementations, mobile device identity 120 can include any data that identifies mobile device 110.

After generating advertisement 117, as illustrated in the implementation of FIG. 1, mobile device 110 utilizes software application 116 to transmit advertisement 117 to other devices, such as listening device 130 and repeater device 150. For example, mobile device 110 may utilize software application 116 to generate advertisement 117, where advertisement 117 includes mobile device identity 120. Mobile device 110 then concurrently transmits advertisement 117 to both listening device 130 and repeater device 150. For example, and as discussed above, in one implementation, listening device 130 and repeater device 150 may each include Bluetooth low energy devices. In such an implementation, mobile device 110 transmits advertisement 117 to each of listening device 130 and repeater device 150 using Bluetooth low energy wireless technology.

In one implementation, different advertisements generated and transmitted by mobile device 110 may include different device identities for mobile device 110. For example, mobile device 110 may change device identity 120 each time mobile device 110 generates and transmits advertisement 117. For another example, mobile device 110 may change device identity 120 for advertisement 117 at the expiration of a given time interval. By using a different device identity 120 when mobile device 110 generates and transmits advertisement 117, mobile device 110 cannot be tracked over time by other devices.

Continuing with the implementation of FIG. 1, in response to repeater device 150 and listening device 130 receiving advertisement 117 from mobile device 110, repeater device 150 both generates and transmits repeated advertisement 156 using software code 154, while listening device starts timer 134 using software code 135. Each of software code 135 and software code 154 corresponds to source code running on listening device 130 and repeater device 154, respectively. As such, listening device 130 and repeater device 150 respectively utilize software code 135 and software code 154 to perform the functions described below by each of listening device 130 and repeater device 150.

Repeater device 150 first generates and transmits repeated advertisement 156 utilizing software code 154. Repeater device 150 generates repeated advertisement 156 by taking advertisement 117 received from mobile device 110 and adding repeater device identity 156, where repeater device identity 156 corresponds to data that includes the identity of repeater device 150. After generating repeated advertisement 156, repeater device 150 transmits repeated advertisement 156 to other devices, such as listening device 130. For example, and using the implementation discussed above where listening device 130 and repeater device 150 each include Bluetooth low energy devices, repeater device 150 transmits repeater advertisement 154 to listening device 130 using Bluetooth low energy wireless technology.

Timer 134 corresponds to a timing device that listening device 130 utilizes to measure a time difference between when listening device 130 receives an original advertisement from a mobile device and when listening device 130 receives a repeated advertisement from a repeater device, where the repeated advertisement corresponds to the original advertisement. For example, in the implementation of FIG. 1, in response to listening device 130 receiving advertisement 117 from mobile device 110, listening device 130 begins timer 134. After beginning timer 134, listening device 130 waits to receive repeated advertisement 156 from repeater device 150 and records how much time passed between receiving advertisement 117 from mobile device 110 and receiving repeated advertisement 156 from repeater device 150.

After listening device 130 records the time difference between receiving advertisement 117 and repeated advertisement 156, listening device 130 utilizes software code 135 to generate and transmit data advertisement 137. Data advertisement 137 corresponds to a data packet that includes mobile device identity 120, repeater device identity 156, listening device identity 138, and timer data 139. As discussed above, mobile device identity 120 corresponds to data that includes the identity of mobile device 110 and repeater device identity 156 corresponds to data that includes the identity of repeater device 150. Furthermore, listening device identity 138 corresponds to data that includes the identity of listening device 130. Timer data 139 corresponds to data that includes the time difference recordings measured by listening device 130, where, as discussed above, a time difference recording measures the time it takes between listening device 130 receiving advertisement 117 from mobile device 110 and listening device 130 receiving repeated advertisement 156 from repeater device 150.

It should be noted that the implementation of FIG. 1 only illustrates listening device 130 receiving one advertisement 117 from mobile device 110 and one repeated advertisement 156 from repeater device 150; however, the present disclosure is not limited to the implementation of FIG. 1. For example, in one implementation, listening device 130 may receive multiple advertisements from mobile device 110 and multiple repeated advertisements from repeater device 150, where each of the repeated advertisements corresponds to one of the advertisements. As another example, in a second implementation, listening device 130 may receive one advertisement 117 from mobile device 110 and multiple repeated advertisements from more than one repeater device, where each of the multiple repeated advertisements corresponds to advertisement 117. Finally, for a third example, in third implementation, listening device 130 may receive multiple advertisements from mobile device 110 and multiple repeated advertisements from more than one repeater device, where each of the multiple repeated advertisements corresponds to one of the multiple advertisements received from mobile device 110. In each implementation, listening device 130 would record a time difference for each instance of receiving an advertisement 117 from mobile device 110 and receiving a corresponding repeated advertisement 156 from a repeater device 150 in timer data 139.

Also illustrated in implementation of FIG. 1, after listening device 130 generates data advertisement 137, listening device 130 transmits data advertisement 137 to mobile device 110. For example, and using the implementation discussed above where listening device 130 and repeater device 150 each include a Bluetooth low energy device, listening device 130 transmits data advertisement 137 to mobile device 110 using Bluetooth low energy wireless technology.

As further illustrated in the implementation of FIG. 1, after receiving data advertisement 137 from listening device 130, mobile device 110 utilizes device data 118 and algorithm 119 to calculate device location 121 based on data advertisement 137. Device data 118 includes data corresponding to both listening devices and repeater devices, such as listening device 130 and repeater device 150. The data in device data 118 can include, but is not limited to, the identity and location of listening devices and repeater devices. For example, in the implementation of FIG. 1, device data 118 would include listening device identity 138 and listening device location 136 for listening device 130, and repeater device identity 156 and repeater device location 155 for listening device 150, where listening device location 136 and repeater device location 155 correspond respectively to the locations of listening device 130 and repeater device 150. Mobile device 110 can thus use device data 118 to determine listening device location 136 and repeater device location 155 based on listening device identity 138 and repeater device identity 156 from data advertisement 137.

Algorithm 119 calculates device location 121 based on data advertisement 137 using device data 118. To calculate device location 121, algorithm 119 uses time data 138 from data advertisement 137 and the locations of listening device 130 and repeater device 150 from device data 118 to triangulate device location 121. For example, in one implementation, algorithm 119 uses Time Difference of Arrival techniques to determine device location 121 based on data advertisement 137.

It should be noted that the implementation of FIG. 1 further includes server 170 in communication with mobile device 110. In implementations where system 100 includes server 170, server 170 may be utilized by mobile device 110 to determine device location 121. For example, in one implementation, mobile device 110 may not include device data 118 and algorithm 119. In such an implementation, mobile device 110 may transmit data advertisement 137 to server 170 and server 170 may utilize data advertisement 137, device data 118, and algorithm 119 to determine device location 121 in a similar way as mobile device 110 determined device location 121 described above. Server 170 may then transmit device location 121 to mobile device 110. For another example, in one implementation, mobile device 110 may only include algorithm 119, but not device data 118. In such an implementation, server 170 transmits device data 118 to mobile device 110 so that mobile device 110 can calculate device location 121.

As discussed above, in one implementation, each of listening device 130 and repeater device 150 may include Bluetooth low energy devices. In such an implementation, mobile device 110, listening device 130, and repeater device 150 transmit advertisements using Bluetooth low energy specifications. As such, mobile device 110 transmits advertisement 117 on different frequency channels using a given time interval between each frequency channel. For example, mobile device 110 transmits advertisement 117 using three different frequency channels with a 10 mS time interval delay between transmissions on each of the three frequency channels. Mobile device 110 may then repeat the transmission on the three frequency channels using a 20 mS delay after the transmission on the last frequency channel. Furthermore, each of listening device 130 and repeater device 150 may be configured to listen to one of the three frequency channels for receiving advertisement 117 from mobile device 110.

Furthermore, one or more of mobile device 110, listening device 130, or repeater device 150 may add a signature to transmissions for security purposes. For example, either mobile device 110 may add a cryptographic hash to advertisement 117 when generating advertisement 117, or repeater device 150 may add a cryptograph hash to repeated advertisement 156 when generating repeated advertisement 156. In such an example, server 170 would also include data corresponding to the cryptographic hash.

Figure 2:
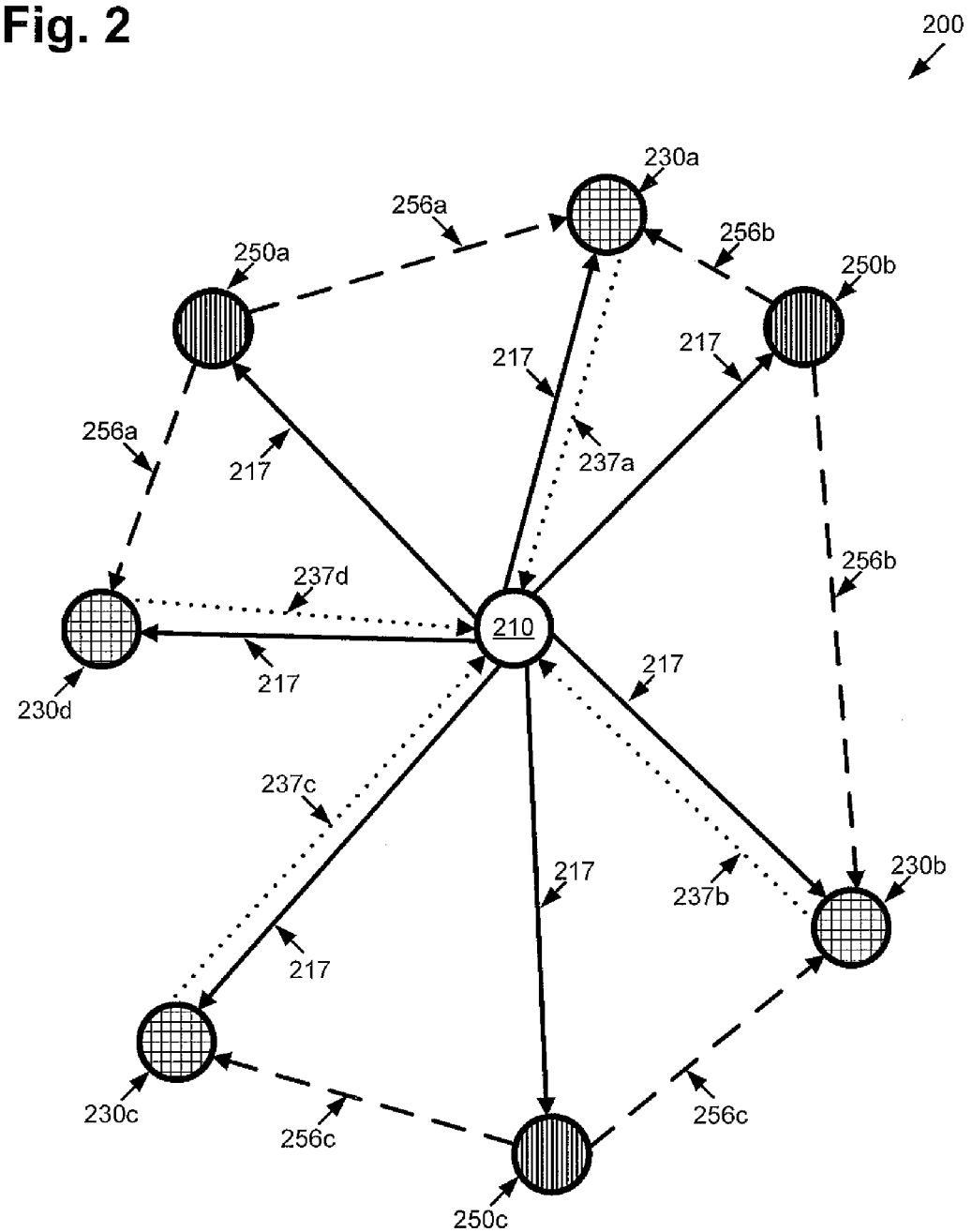
FIG. 2 presents an example of using multiple listening devices and repeater devices to determine a location of a mobile device using reflection-based location detection, according to one implementation of the present disclosure.

FIG. 2 presents an example of using multiple listening devices and repeater devices to determine a location of a mobile device using reflection-based location detection, according to one implementation of the present disclosure. System 200 of FIG. 2 includes mobile device 210, listening device 230a, listening device 230b, listening device 230c, and listening device 230d, collectively referred to as listening devices 230a-d, and repeater device 250a, repeater device 250b, and repeater device 250c, collectively referred to as repeater devices 250a-c. System 200 further includes advertisement 217, data advertisement 237a, data advertisement 237b, data advertisement 237c, and data advertisement 235d, collectively referred to as data advertisements 237a-d, and repeated advertisement 256a, repeated advertisement 256b, repeated advertisement 256c, and repeated advertisement 254d, collectively referred to as repeated advertisements 256a-c.

With reference to FIG. 2, mobile device 210 and advertisement 217 correspond respectively to mobile device 110 and advertisement 217 from FIG. 1. Each one of listening devices 230a-d, repeater devices 250a-c, data advertisements 237a-d, and repeated advertisements 256a-c from FIG. 2 corresponds respectively to listening device 130, repeater device 150, data advertisement 137, and repeated advertisement 156 from FIG. 1.

As illustrated in the implementation of FIG. 2, mobile device 210 transmits advertisement 217 (represented in FIG. 2 by the solid arrows) to listening devices 230a-d and repeater devices 250a-c. For example, and as discussed above in one implementation, each of listening devices 230a-d and repeater devices 250a-c include Bluetooth low energy devices. In such an implementation, mobile device 210 may transmit advertisement 217 to listening devices 230a-d and repeater devices 250a-c using Bluetooth low energy wireless technology.

Also illustrated in the implementation of FIG. 2, repeater devices 250a-c transmit repeated advertisements 256a-c (represented in FIG. 2 by the dashed arrows) to listening devices 230a-d. For example, and as discussed in regards to FIG. 1, in response to listening devices 250a-c receiving advertisement 217 from mobile device 210, repeater devices 250a-c generate repeated advertisements 256a-c using advertisement 217 and adding a repeater device identity. After generating repeated advertisements 256a-c, listening devices 250a-c transmit repeated advertisements 256a-c to listening devices 230a-d. For example, and using the implementation above where each of listening devices 230a-d and repeater devices 250a-c include Bluetooth low energy devices, repeater devices 250a-c transmit repeated advertisements 256a-c to listening devices 230a-d using Bluetooth low energy wireless technology.

For example, and as illustrated in FIG. 2, repeater device 250a generates repeater advertisement 256a by adding repeater device identity of repeater device 250a to advertisement 217. Repeater device 250a then transmits repeater advertisement 256a to each of listening device 230a and listening device 230d. For a second example, repeater device 250b generates repeater advertisement 256b by adding repeater device identity of repeater device 250b to advertisement 217. Repeater device 250b then transmits repeater advertisement 256b to each of listening device 230a and listening device 230b. Finally, for a third example, repeater device 250c generates repeater advertisement 256c by adding repeater device identity of repeater device 250c to advertisement 217. Repeater device 250c then transmits repeater advertisement 256c to each of listening device 230b and listening device 230c.

Also illustrated in the implementation of FIG. 2, listening devices 230a-d transmit data advertisements 237a-d (represented in FIG. 2 as dotted arrows) to mobile device 210. For example, and as discussed above with regards to FIG. 1, in response to listening devices 237a-d receiving advertisement 217 from mobile device 210, listening devices 237a-d start a timer to time how long it takes for listening devices 237a-d to receive repeated advertisements that correspond to advertisement 217 from repeater devices, such as receiving repeated advertisements 256a-c from repeater devices 250a-c. Listening devices 230a-d then record the time difference between receiving advertisement 217 from mobile device 210 and receiving repeated advertisements 256a-c from repeater device 250a-c in data advertisements 237a-d. Also, listening devices 230a-d transmit data advertisements 237a-d to mobile device 210. For example, and using the implementation above where each of listening devices 230a-d and repeater devices 250a-c include Bluetooth low energy devices, listening devices 230a-d transmit data advertisements 237a-d to mobile device 210 using Bluetooth low energy wireless technology.

For example, and as illustrated in FIG. 2, data advertisement 237a would include data describing time differences of arrival between listening device 230a receiving advertisement 217 from mobile device 210 and receiving each of repeated advertisement 256a and repeated advertisement 256b from repeater device 250a and repeater device 250b, respectively. Data advertisement 237b would include data describing time differences of arrival between listening device 230b receiving advertisement 217 from mobile device 210 and receiving each of repeated advertisement 256b and repeated advertisement 256c from repeater device 250b and repeater device 250c, respectively. Data advertisement 237c would include data describing a time difference of arrival between listening device 230c receiving advertisement 217 from mobile device 210 and receiving repeated advertisement 256c from repeater device 250c. Finally, data advertisement 235d would include data describing a time difference of arrival between listening device 230d receiving advertisement 217 from mobile device 210 and receiving repeated advertisement 256a and repeater device 250a.

Figure 3:
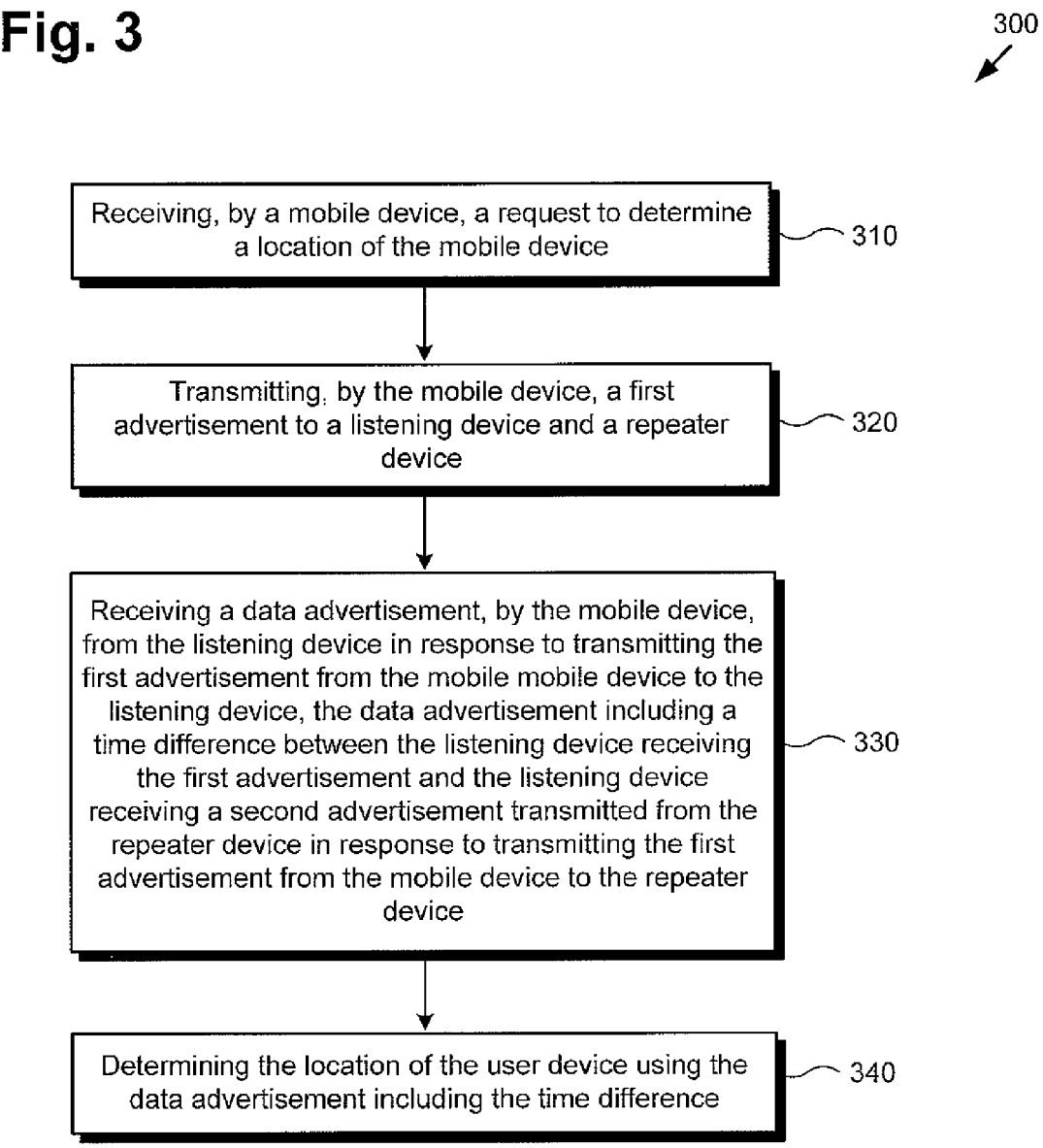
FIG. 3 shows a flowchart illustrating a method for reflection-based location detection, according to one implementation of the present disclosure.

FIG. 3 shows a flowchart illustrating a method for reflection-based location detection, according to one implementation of the present disclosure. The approach and technique indicated by flowchart 300 are sufficient to describe at least one implementation of the present disclosure, however, other implementations of the disclosure may utilize approaches and techniques different from those shown in flowchart 300. Furthermore, while flowchart 300 is described with respect to FIG. 1, the disclosed inventive concepts are not intended to be limited by specific features shown and described with respect to FIG. 1. Furthermore, with respect to the method illustrated in FIG. 3, it is noted that certain details and features have been left out of flowchart 300 in order not to obscure the discussion of inventive features in the present application.

Referring now to flowchart 300 of FIG. 3, flowchart 300 includes receiving, by a mobile device, a request to determine a location of the mobile device (310). For example, processor 111 of mobile device 110 may execute software application 116 to receive a request to determine device location 121. The request may be received by a user of mobile device 110 using user interface 113, or the request may be received by an application or program running on mobile device 110. As discussed above, device location 121 corresponds to a location of mobile device 110.

Flowchart 300 also includes transmitting, by the mobile device, a first advertisement to a listening device and a repeater device (320). For example, processor 111 of mobile device 110 may execute software application 116 to transmit advertisement 117 to listening device 130 and repeater device 150. As discussed above, mobile device 110 transmits advertisement 117 to listening device 130 and repeater device 150 concurrently, where advertisement 117 includes mobile device identity 120. Mobile device identity 120 corresponds to data that includes the identity of mobile device 110. Furthermore, in the implementation, where listening device 130 and repeater device 150 each include Bluetooth low energy devices, mobile device 110 transmits advertisement 117 to listening device 130 and repeater device 150 using Bluetooth low energy wireless technology.

Flowchart 300 also includes receiving a data advertisement, by the mobile device, from the listening device in response to transmitting the first advertisement from the mobile device to the listening device, the data advertisement including a time difference between the listening device receiving the first advertisement and the listening device receiving a second advertisement transmitted from the repeater device in response to transmitting the first advertisement from the mobile device to the repeater device (330).

For example, processor 111 of mobile device 110 may execute software application 116 to receive data advertisement 137 from listening device 130 in response to transmitting advertisement 117 from user device 110 to listening device 130. As discussed above, listening device 130 generates data advertisement 137 to include timer data 139, where timer data 139 corresponds to data that includes a time difference of arrival between listening device 130 receiving advertisement 117 from mobile device 110 and listening device 130 receiving repeated advertisement 156 from repeater device 150. Repeater device 150 transmits repeated advertisement 156 to listening device 130 in response to repeater device 150 receiving advertisement 117 from user device 110. In the implementation, as discussed above where listening device 130 and repeater device 150 include Bluetooth low energy devices, mobile device 110 may receive data advertisement 137 from listening device 130 using Bluetooth low energy wireless technology.

Flowchart 300 also includes determining the location of the mobile device using the data advertisement including the time difference (340). For example, processor 111 of mobile device 110 may execute software application 116 to determine device location 121 using data advertisement 137 including timer data 139. As discussed above, in one implementation, processor 111 of mobile device 110 determines device location 121 using algorithm 119 based on data advertisement 137 including timer data 139 and device data 118, where device data 118 includes, but is not limited to, listening device identity 138 and listening device location 136 of listening device 130, and repeater device identity 156 and repeater device location 155 of repeater device 150. Algorithm 119 can thus calculate device location 121 using listening device location 136, repeater device location 156, and timer data 139 from data advertisement 137 to triangulate device location 121.

In another implementation, processor 111 of mobile device 110 may execute software application 116 to determine device location 121 by transmitting data advertisement 137 including timer data 139 to server 150. Server 150 may then calculate device location 121 in a similar way as mobile device 110 calculated device location 121 discussed above. Finally, processor 111 of mobile device 110 may execute software application 116 to receive device location 121 from server 170.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A mobile device comprising:
a memory storing a software code; and
a processor configured to execute the software code to:
transmit a first advertisement to a listening device and a repeater device;
receive a data advertisement from the listening device in response to transmitting the first advertisement from the mobile device to the listening device, the data advertisement including a time difference between the listening device receiving the first advertisement and the listening device receiving a second advertisement transmitted from the repeater device in response to transmitting the first advertisement from the mobile device to the repeater device; and
determine a location of the mobile device using the data advertisement including the time difference.

2. The mobile device of claim 1, wherein transmitting the first advertisement includes transmitting the first advertisement using Bluetooth low energy.

3. The mobile device of claim 1, wherein the listening device and the repeater device each include Bluetooth low energy devices.

4. The mobile device of claim 1, wherein determining the location includes transmitting the data advertisement including the time difference to a server and receiving the location from the server.

5. The mobile device of claim 1, wherein determining the location includes calculating the location using an algorithm based on the data advertisement including the time difference.

6. The mobile device of claim 1, wherein the data advertisement further includes an identity of the listening device and an identity of the repeater device.

7. The mobile device of claim 1, wherein the processor is further configured to execute the software code to:
transmit the first advertisement to a plurality of listening devices including the listening device and a plurality of repeater devices including the repeater device;
receive a plurality of data advertisements each from one of the plurality of listening devices; and
determine the location using the plurality of data advertisements.

8. A listening device comprising:
a memory storing a software code; and
a processor configured to execute the software code to:
receive a first advertisement from a mobile device;
receive a second advertisement from a repeater device in response to the repeater device receiving the first advertisement from the mobile device;
generate a data advertisement, the data advertisement including a time difference between the listening device receiving the first advertisement from the mobile device and the listening device receiving the second advertisement from the repeater device; and
transmit the data advertisement including the time difference to the mobile device to facilitate determining a location of the mobile device by the mobile device using the data advertisement including the time difference.

9. The listening device of claim 8, wherein the first advertisement and the second advertisement are received using Bluetooth low energy and the data advertisement is transmitted using the Bluetooth low energy.

10. The listening device of claim 8, wherein the listening device and the repeater device each include Bluetooth low energy devices.

11. The listening device of claim 8, wherein to determine the location of the mobile device, the mobile device transmits the data advertisement including the time difference to a server and receives the location from the server.

12. The listening device of claim 8, wherein to determine the location of the mobile device, the mobile device calculates the location using an algorithm based on the data advertisement including the time difference.

13. The listening device of claim 8, wherein the data advertisement further includes an identity of the listening device and an identity of the repeater device.

14. A method for determining a location of a mobile device, the method comprising:
- transmitting, by the mobile device, a first advertisement to a listening device and a repeater device;
- receiving a data advertisement, by the mobile device, from the listening device in response to transmitting the first advertisement to the listening device, the data advertisement including a time difference between the listening device receiving the first advertisement and the listening device receiving a second advertisement transmitted from the repeater device in response to transmitting the first advertisement from the mobile device to the repeater device; and
- determining the location of the mobile device using the data advertisement including the time difference.

15. The method of claim 14, wherein transmitting the first advertisement by the mobile device includes transmitting the first advertisement using Bluetooth low energy.

16. The method of claim 14, wherein the listening device and the repeater device each include Bluetooth low energy devices.

17. The method of claim 14, wherein to determine the location of the mobile device, the method comprises:
- transmitting, by the mobile device, the data advertisement including the time difference to a server; and
- receiving, by the mobile device, the location from the server.

18. The method of claim 14, wherein to determine the location of the mobile device, the method comprises:
- calculating, by the mobile device, the location using an algorithm based on the data advertisement including the time difference.

19. The method of claim 14, wherein the data advertisement further includes an identity of the listening device and an identity of the repeater device.

20. The method of claim 14 further comprising:
- transmitting the first advertisement to a plurality of listening devices including the listening device and a plurality of repeater devices including the repeater device;
- receiving a plurality of data advertisements each from the plurality of listening devices; and
- determining the location using the plurality of data advertisements.

* * * * *